United States Patent
Huynh et al.

(10) Patent No.: US 8,220,052 B2
(45) Date of Patent: Jul. 10, 2012

(54) APPLICATION BASED INTRUSION DETECTION

(75) Inventors: Lap T. Huynh, Cary, NC (US); Linwood H. Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2324 days.

(21) Appl. No.: 10/457,908

(22) Filed: Jun. 10, 2003

(65) Prior Publication Data

US 2004/0255153 A1 Dec. 16, 2004

(51) Int. Cl.
*H04L 29/06* (2006.01)
(52) U.S. Cl. ......................................................... 726/23
(58) Field of Classification Search ............... 726/22–25
See application file for complete search history.

(56) References Cited

U.S. PATENT DOCUMENTS

| | | |
|---|---|---|
| 5,832,228 A | 11/1998 | Holden et al. |
| 6,272,538 B1 | 8/2001 | Holden et al. |
| 6,321,338 B1 | 11/2001 | Porras et al. |
| 6,460,141 B1 | 10/2002 | Olden |
| 6,499,110 B1 * | 12/2002 | Moses et al. ...................... 726/1 |
| 6,542,508 B1 | 4/2003 | Lin |
| 2003/0023874 A1 | 1/2003 | Prokupets et al. |
| 2003/0051026 A1 | 3/2003 | Carter et al. |
| 2003/0101358 A1 * | 5/2003 | Porras et al. .................. 713/201 |
| 2003/0149887 A1 * | 8/2003 | Yadav ........................... 713/200 |

OTHER PUBLICATIONS

Welz et al., "Interfacing Trusted Applications with Intrusion Detection Systems", 2001, pp. 37-53, obtained from http://www.springerlink.com/content/v660gq9b8cdvb8uc/fulltext.pdf.*
Sielken, Robert S., "Application Intrusion Detection", 1999, pp. 1-50.*

* cited by examiner

*Primary Examiner* — Jeffrey D Popham
(74) *Attorney, Agent, or Firm* — Stevens & Showalter LLP

(57) ABSTRACT

A method of detecting an intrusion into a computer. At least one communication to an application program is selectively evaluated by the application program accessing an intrusion detection service to evaluate the communication.

27 Claims, 4 Drawing Sheets

APPLICATION BASED INTRUSION DETECTION

FIELD OF THE INVENTION

This invention relates generally to computer security and, more particularly, to detecting computer intrusions that violate computer security policies.

BACKGROUND OF THE INVENTION

In the computer security field, "intrusion" is a broad term encompassing many undesirable activities. The objective of an intrusion may be to acquire information that a person is not authorized to have (referred to as "information theft"), it may be to cause business harm by rendering a network, system, or application unusable (referred to as "denial of service") and/or, it may be to gain unauthorized use of a system as a stepping stone for further intrusions elsewhere. Intrusions can follow a pattern of information gathering, attempted access, and then destructive attacks.

Some intrusions can be detected and neutralized by the target system, although often not in real time. Other intrusions may not be effectively neutralized by the target system. Intrusions can also make use of "spoofed" packets which are not easily traceable to their true origin. Many intrusions now make use of unwitting accomplices—that is, machines or networks that are used without authorization to hide the identity of the intruder. For these reasons, detecting attempts at information gathering, access attempts, and intrusion accomplice behaviors can be an important part of intrusion detection.

As illustrated in FIG. 1, intrusions can be initiated against a host 100 on an internal network 115 by, for example, an intruder 130 that is on an external network 135 (e.g., internet) or from an intruder 110 that is on the internal network 115. A firewall 120 may provide some protection against intrusions from external networks. However, it may not prevent intrusions once the firewall has "approved" entry into the internal network 115, and it may not provide protection when the intrusion is initiated from inside the internal network 115 (e.g., intruder 110). In addition, end-to-end encryption can limit the types of intrusions that can be detected by an intermediate device, such as the firewall 120, because the intermediate device may be unable to evaluate the packets in an unencrypted form for evidence of an intrusion.

An Intrusion Detection System (hereinafter, "IDS") can provide detection of many types of intrusions. Referring to FIG. 2, an IDS may include sniffers that examine network traffic. Sniffers may be placed at strategic points in networks, such as shown by a sniffer 210 in front of the firewall 220; by a sniffer 230 behind the firewall 220; by a sniffer 240 on the internal network 115; and/or by a sniffer 250 between a host 260 and the internal network 115. Sniffers may use "pattern matching" to try to match communicated information against a known intrusion signature. Performing pattern matching on all network traffic can require significant processing time, and may result in a backlog of traffic to be analyzed and a resulting delay in identifying an intrusion. Growth in the number of known intrusion signatures that are used for pattern matching further increases the processing time and associated delay in identifying an intrusion.

Upon detecting an intrusion, a sniffer may alert an IDS management system 270, which may take action to stop an intrusion. For example, sniffers 230 and 250 have been illustrated as communicating "alerts" to the IDS management system 270. Sniffers may also, or may alternatively, notify a service, such as IBM's Emergency Response Services (ERS) unit 200, which provides logging and analysis of security alerts that are detected by IDS components. In the illustrated example, the sniffer 210 before the firewall 220 sends alerts to the Emergency Response Services unit 200. However, a damaging intrusion may occur before a sniffer identifies the intrusion and an IDS management system takes action to stop the intrusion.

Further background discussion on intrusion detection services is provided in U.S. patent application Ser. No. 10/058,870, filed Jan. 28, 2002, and entitled Integrated Intrusion Detection Services.

SUMMARY OF THE INVENTION

Some embodiments of the present invention provide a method of detecting an intrusion into a computer. At least one communication with an application program is selectively evaluated by the application program accessing an intrusion detection system module to evaluate the communication. Accordingly, the application program may detect an intrusion that is directed at itself, and may thereby be able to more quickly detect and react to the intrusion. Moreover, the application program may examine the communication after it has been unencrypted, and/or before it is encrypted, which may allow more accurate detection of intrusions.

Further embodiments of the present invention may include allocating the application program and the intrusion detection system module to the same logical memory space. An intrusion may be detected by the intrusion detection system module comparing the communication to an intrusion detection system policy. The application program may also take a response action based on the detection of an intrusion.

DETAILED DESCRIPTION

Figure 1:
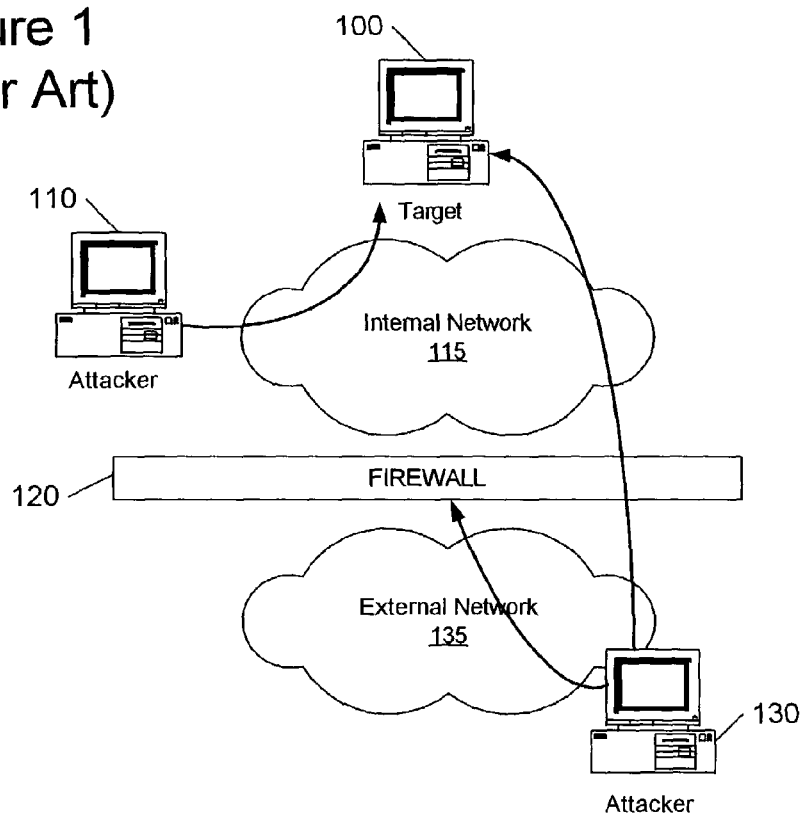
FIG. 1 is a block diagram of a computer networking system according to the prior art that is subject to security intrusions.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like elements throughout.

As will be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user computer, partly on the user computer, as a stand-alone software package, partly on the user's computer and partly on a remote computer or entirely on the remote computer. In the latter scenario, the remote computer may be connected to the user's computer through, for example, a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
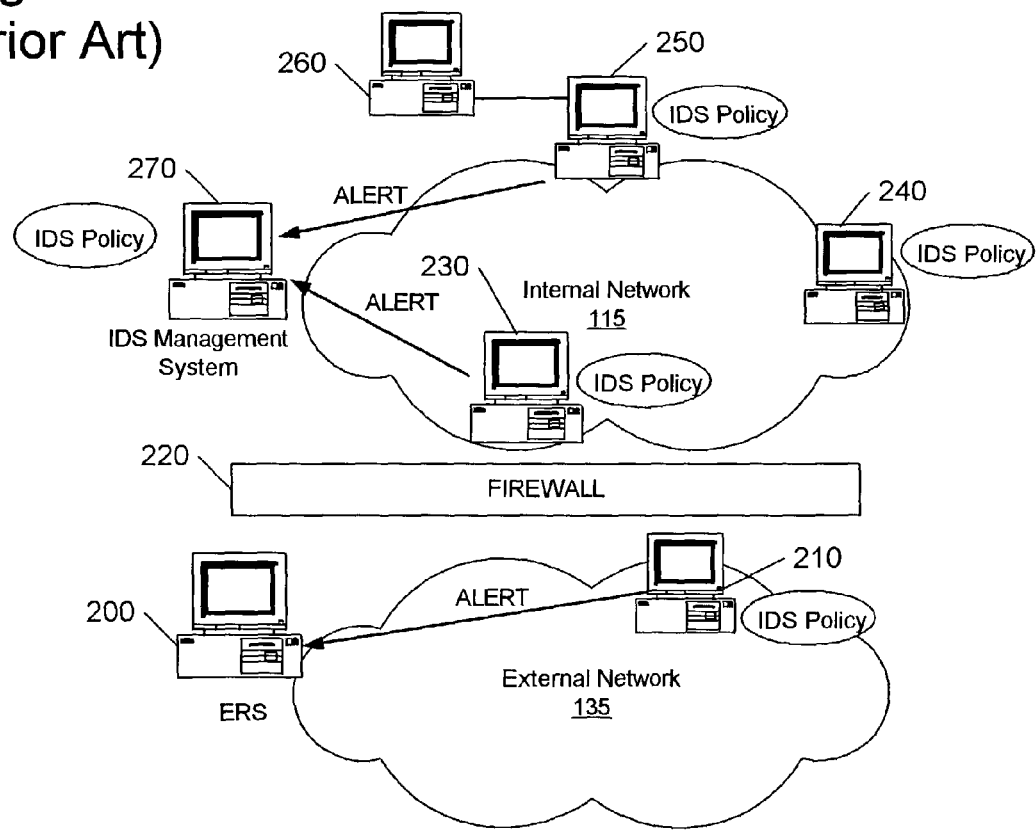
FIG. 2 is a block diagram of a computer networking system with intrusion detection components according to the prior art.
Figure 3:
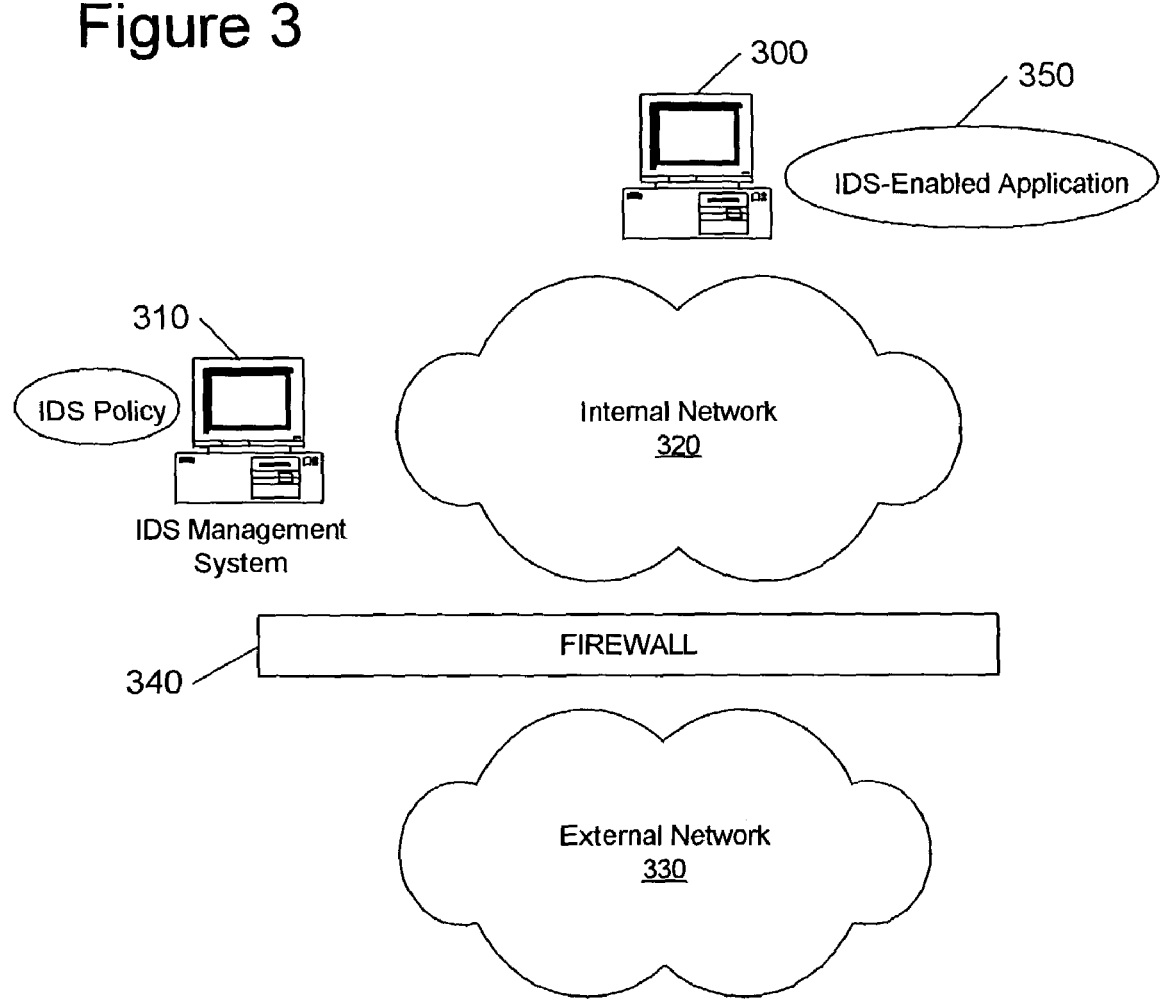
FIG. 3 is a block diagram of a computer networking system with intrusion detection components according to various embodiments of the present invention.

FIG. 3 illustrates a computer networking system with intrusion detection components according to various embodiments of the present invention. The system includes a host computer 300 and an IDS management system 310 that are connected by an internal network 320. The internal network 320 is connected to an external network 330 through a firewall 340. The IDS management system 310 maintains an IDS policy for the system, thereby forming an IDS policy repository. In contrast to the prior art computer system illustrated in FIG. 2, the host 300 shown in FIG. 3 is at least partially responsible for detecting intrusions into itself. The host 300 includes at least one IDS-enabled application 350 that is configured to detect intrusions into the IDS-enabled application 350 itself. The system may further include additional hosts and/or additional IDS components such as, for example, sniffers on the internal network 320 and/or the external network 330 and an alert monitoring system such as, for example, the ERS 200 in FIG. 2.

The IDS policies in the IDS management system 310 and/or the host 300 may include one or more signature files and/or policy rules. The signature files may be compared against network traffic to identify possible intrusions, and may include general intrusion signatures and/or specific known intrusion signatures. The policy rules may include conditional parts that describe expected characteristics of an intrusion, and may be used to determine when a rule is to be triggered, and may describe one or more actions to be taken in response to detecting an intrusion.

Figure 4:
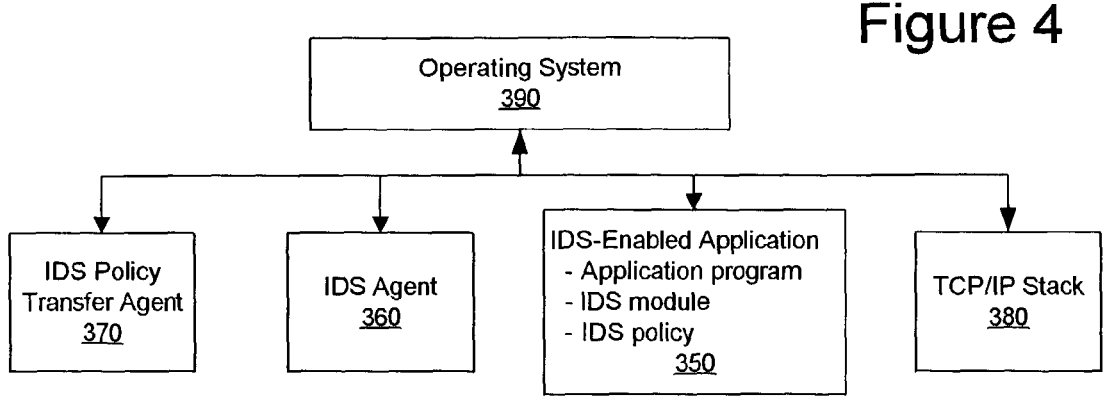
FIG. 4 is a block diagram of a host computer with an intrusion detection system enabled application according to various embodiments of the present invention.

Referring to FIG. 4, the host 300 may execute the one or more IDS-enabled applications 350, an IDS agent 360, an IDS policy transfer agent 370, network programs, such as a TCP/IP stack 380, and an operating system 390 that manages communication among the applications, network programs, and agents. The IDS-enabled application 350 may include an application program, an IDS module, and an IDS policy, and one or more of which may be allocated to the same, or different, logical memory space during the execution of the application program. The application program provides application functionality to, for example, an operator of the host, which is unrelated to detection of intrusions, and, as described below, the application program may also use the IDS module to detect an intrusion and/or to take actions when an intrusion has been detected.

The IDS policy in the IDS-enabled applications 350 may be downloaded from the IDS management system 310, which may allow more uniform treatment of intrusion detection among hosts in the system. For example, the IDS-enabled application 350 may become initialized with an IDS policy by the application program calling the IDS module with an initialization request. The application program may inform the IDS module where in the application program the IDS policy is to be checked against information that has been received from an incoming communication and/or which is to be sent as an outgoing communication. The IDS module may cause the IDS policy transfer agent 370 to read an IDS policy that may be specifically configured for the IDS-enabled application 350 from the IDS management system 310, and to allocate the retrieved IDS policy to the local memory space of the application program. For various reasons, such as security, the application program should be provided only with relevant IDS policies of which it has been authorized to receive. The IDS policy transfer agent 370 may check the authorization of the application to view an IDS policy before placing the retrieved IDS policy in the memory space of the application. For example, in a host with a z/OS operating system, a RACF (resource access control facility) resource profile may be defined that represents the policy, the discipline (IDS), and the application. The permission of the RACF resource profile may then be verified. The IDS policy transfer agent 370 may then provide a local copy of the IDS policy to the IDS module within the application memory space.

The application program may detect intrusions by accessing the IDS module to compare communication information that has been received from, for example, the internal network 320 and/or another application against the IDS policy in the IDS-enabled application. The application program may also detect intrusions in response to, for example, sensing an event that is indicative of a potential intrusion and using the IDS module to evaluate such events based on rules in the IDS policy. For example, the application program may call the IDS module to evaluate a file transfer request made under a file transfer protocol (FTP) where the recipient of the requested file is a computer other than the one initiating the request. The application program (i.e., FTP) may determine that the example file transfer request is a bounce attack intrusion, which is well known in the art.

Figure 5:
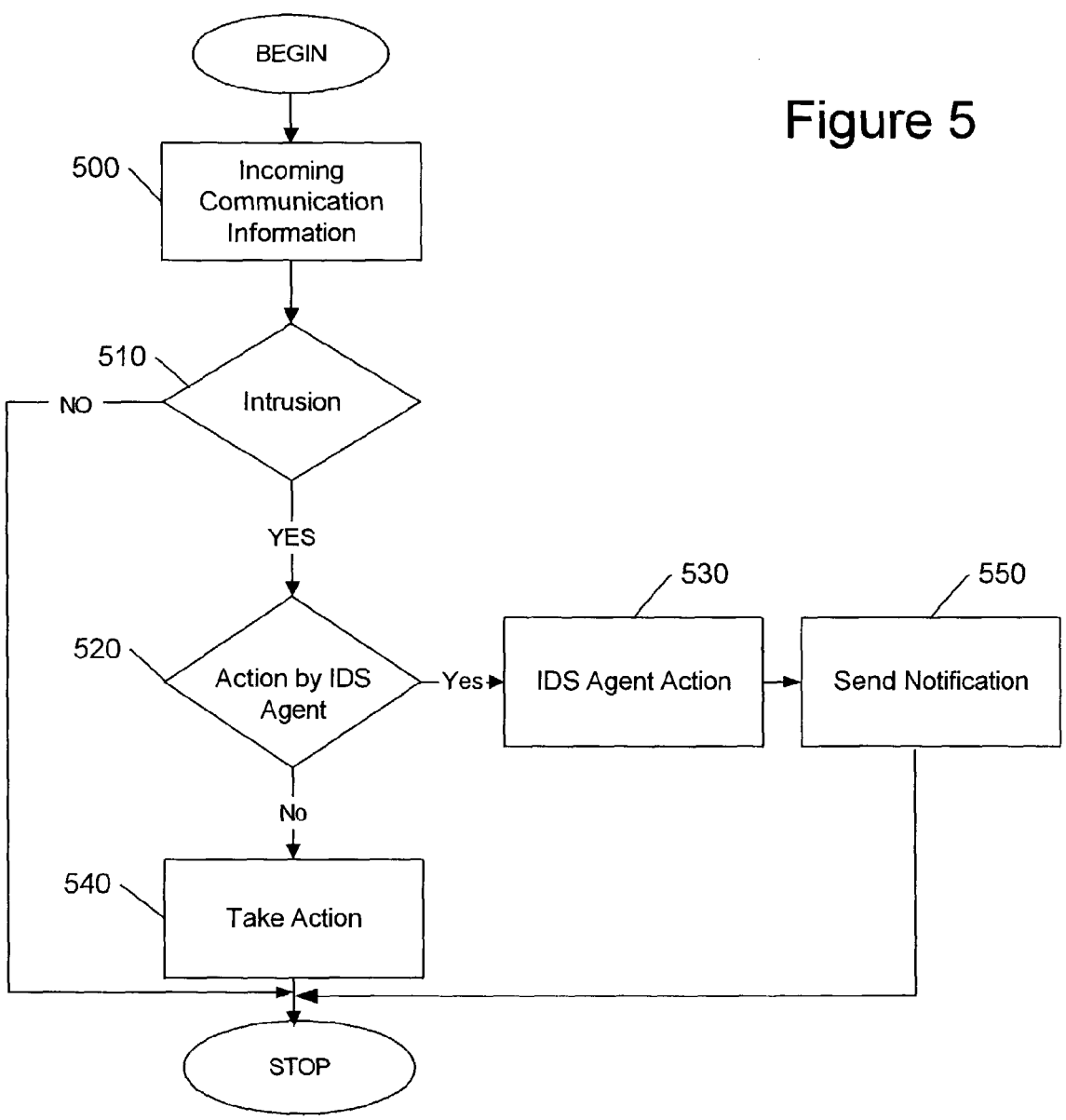
FIG. 5 is a flowchart that illustrates operations for detecting intrusions according to various embodiments of the present invention.

When an intrusion has been detected, the application program may then use the IDS module to retrieve appropriate actions from the IDS policy that can be taken by the application and/or the IDS agent to stop, and possibly remedy, the effect of an intrusion. FIG. 5 shows operations that may be performed to detect intrusions and to take responsive actions. In block 500, the application program receives information, such as a network data packet, from the internal network 320 and/or another application, and/or has information that is to be transmitted. In block 510, the information is selectively evaluated for an intrusion by the IDS module. The evaluation may include comparing the information to the IDS policy, which may include a set of known intrusion signatures that may be matched to the information. When an intrusion is detected at block 510, a conditional response is made at block 520 depending upon whether response actions, which may be taken in response to an intrusion, are to be taken by the IDS agent 360 or by the application 350. When the response actions are to be taken by the IDS agent, at block 520, the IDS module may provide information on itself and/or characteristics of the intrusion to the IDS agent 360 and request action therefrom. At block 530, the IDS agent 360 performs action based on the information from the IDS module. At block 550, the IDS agent 360 may report an alert to the IDS management system 310, where the alert may be logged, further evaluation may be performed to determine whether an intrusion has occurred, and/or where further actions may be performed to stop the intrusion and/or to remedy its effects.

At block 540, the application 350 takes actions such as to, for example, stop the intrusion and/or to remedy its affects. Actions by the application 350 may include discarding the information and/or discontinuing communication with a source of the incoming information (e.g., breaking the connection with the source and/or closing a socket).

Referring back to block 510, when an intrusion is not detected, the application 350 may proceed to use the incoming communication information.

Figure 6:
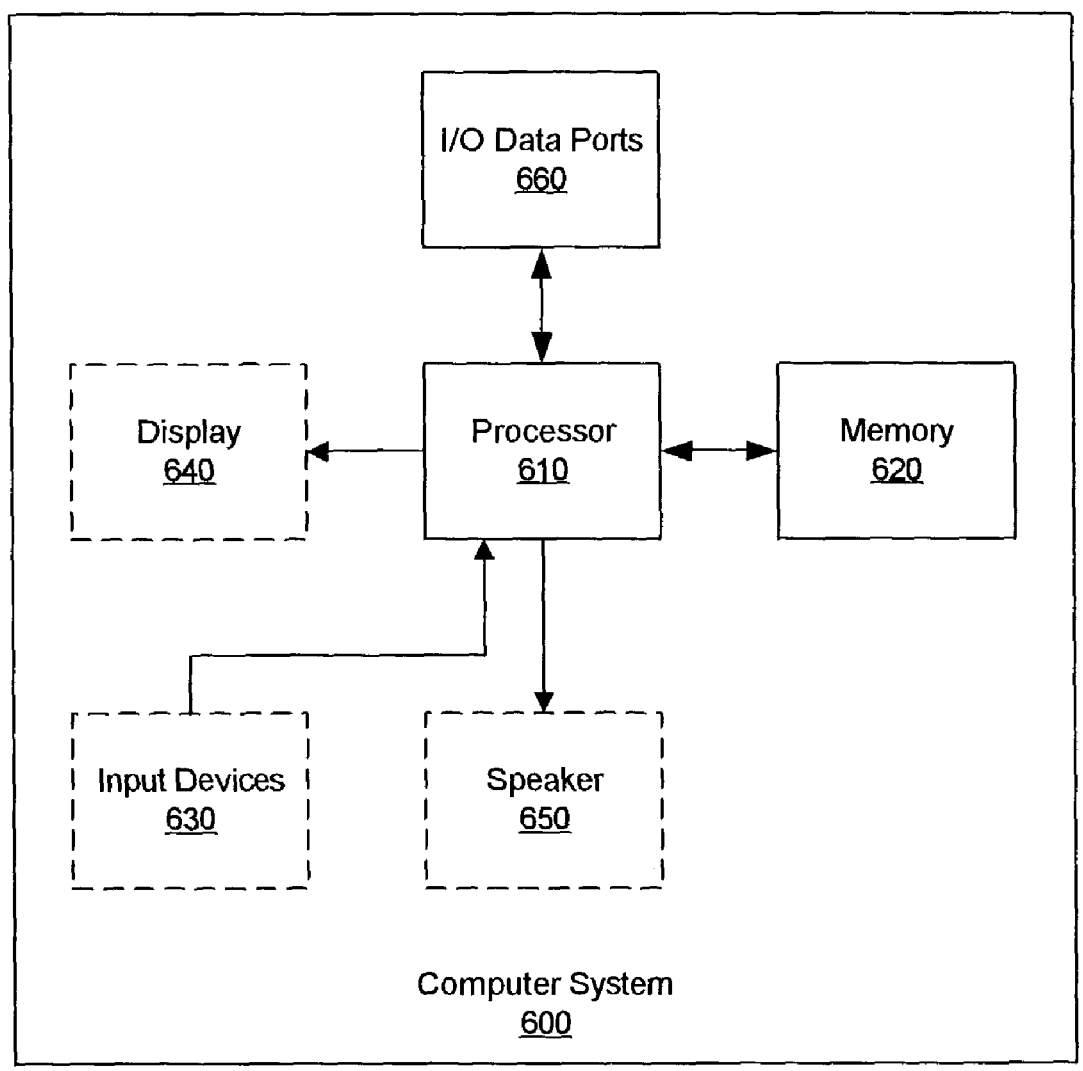
FIG. 6 is a block diagram of a computer system according to embodiments of the present invention.

FIG. 6 illustrates an exemplary embodiment of a host computer system 600 suitable for executing one or more IDS-enabled applications, an IDS agent, an IDS policy transfer agent, network programs, and an operating system, for example as shown in FIG. 4, in accordance with embodiments of the present invention. The computer system 600 typically includes a processor 610 that communicates with a memory 620. The computer system 600 may, optionally, include input device(s) 630 such as a keyboard or keypad, and a display 640 (illustrated in dashed lines) that also communicate with the processor 610. The computer system 600 may further include optional devices such as a speaker 650, and an I/O data port(s) 660 that also communicate with the processor 610. The I/O data ports 660 can be used to transfer information between the computer system 600 and another computer system or a network. These components may be conventional components such as those used in many conventional computer systems which may be configured to operate as described herein.

The processor 610 can be any commercially available or custom microprocessor. The memory 620 is representative of the overall hierarchy of memory devices containing the software and data used to implement the functionality of the computer system 600. The memory 620 can include, but is not limited to, the following types of devices: cache, ROM, PROM, EPROM, EEPROM, flash memory, SRAM, and DRAM. The memory 620 may include several categories of software and data used in the computer system 600: an operating system; application programs; input/output (I/O) device drivers; and data. As will be appreciated by those of skill in the art, the operating system may be any operating system suitable for use with a computer system, such as OS/2, AIX or System390 from International Business Machines Corporation, Armonk, N.Y., Windows95, Windows98, Windows2000, Windows NT, Windows ME, Windows XP from Microsoft Corporation, Redmond, Wash., Unix or Linux. The I/O device drivers typically include software routines accessed through the operating system by the application programs to communicate with devices such as the I/O data port(s) 660 and certain memory 620 components. The application programs are illustrative of the programs that implement the various features of the data processing system 600 and preferably include at least one application which supports operations according to embodiments of the present invention. Finally, the data represents the static and dynamic data used by the application programs, the operating system, the I/O device drivers 660, and other software programs that may reside in the memory 620.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of detecting an intrusion in a host computer that is connected to an intrusion detection management system comprising:

executing on the host computer, an intrusion detection system agent, an intrusion detection system policy transfer agent and an intrusion detection system enabled application having an application program and an intrusion detection system module;

communicating an initialization request from the application program to the corresponding intrusion detection system module to begin intrusion detection;

initiating a request by the intrusion detection system module to the policy transfer agent to provide an intrusion detection system policy specifically configured for the intrusion detection system enabled application;

utilizing the policy transfer agent to check whether the intrusion detection system enabled application is authorized to receive the requested intrusion detection system policy and communicating the requested intrusion detection system policy to the intrusion detection system enabled application if authorized;

initializing the intrusion detection system enabled application with the intrusion detection system policy if the intrusion detection system enabled application is properly authorized by the policy transfer agent; and detecting for intrusions by the intrusion detection system enabled application if the intrusion detection system application is properly authorized by the policy transfer agent by:

identifying by the application program, where in the application code the intrusion detection system policy is to be checked against information that has either been received as an incoming communication, or which is to be sent as an outgoing communication;

obtaining information by the application program;

selectively evaluating the information obtained by the application program against information in the intrusion detection system policy by the corresponding intrusion detection system module;

making a conditional response based upon information in the intrusion detection system policy if an intrusion associated with the application program is detected, where the conditional response determines whether at least one response action should be taken by the intrusion detection agent, by the application program or by both the intrusion detection system agent and the application program;

communicating a request from the intrusion detection system module to the intrusion detection system agent to take action, wherein the request identifies at least one of the intrusion detection system module itself or characteristics of the intrusion and taking action by the intrusion detection system agent based upon the request received from the intrusion detection system module associated with the application program if the conditional response determines that the intrusion detection system agent should take action; and taking action by the application program associated with the detected intrusion based upon information received from the intrusion detection system module if the conditional response determines that the application program should take action.

2. The method of claim 1, further comprising allocating the application program and the intrusion detection system module to the same logical memory space.

3. The method of claim 1, wherein selectively evaluating the information obtained by the application program against information in the intrusion detection system policy by the corresponding intrusion detection system module comprises comparing the information obtained by the application program to the intrusion detection system policy.

4. The method of claim 3, further comprising allocating the application program, the intrusion detection system module, and the intrusion detection system policy to the same logical memory space.

5. The method of claim 3, further comprising downloading the intrusion detection system policy from a network-accessible repository to the intrusion detection system module.

6. The method of claim 3, further comprising downloading the intrusion detection system policy from a local repository to the intrusion detection system module.

7. The method of claim 3, wherein the intrusion detection system policy comprises one or more response actions to be taken based on the comparing of the information obtained by the application program to the intrusion detection system policy.

8. The method of claim 1, wherein the obtaining information by the application program comprises receiving a communication to the application program and the taking action by the application program associated with the detected intrusion comprises discarding information in the communication.

9. The method of claim 1, wherein the obtaining information by the application program comprises receiving a communication to the application program and the taking action by the application program associated with the detected intrusion comprises discontinuing communication with a source of the communication.

10. The method of claim 1, wherein the taking action by the application program associated with the detected intrusion comprises selecting a response based on characteristics of the detected intrusion.

11. The method of claim 1, wherein the obtaining information by the application program comprises receiving a communication to the application program and the taking action by the intrusion detection agent comprises discontinuing communication with a source of the communication.

12. The method according to claim 1, further comprising utilizing the transfer agent to check the authorization of the application program before providing the intrusion detection policy in the same memory space as the application program.

13. The method according to claim 1, wherein the obtaining information by the application program comprises at least one of sensing events or receiving communications.

14. A computer program product for detecting an intrusion in a host computer that is connected to an intrusion detection management system, the computer program product comprising a computer readable storage device storing computer code comprising:

application program code that is configured to execute on the host computer, an intrusion detection system agent, an intrusion detection system policy transfer agent and an intrusion detection system enabled application having an application program and an intrusion detection system module;

application program code that is configured to communicate an initialization request from the application program to the corresponding intrusion detection system module to begin intrusion detection;

application program code that is configured to initiate a request by the intrusion detection system module to the policy transfer agent to provide an intrusion detection system policy specifically configured for the intrusion detection system enabled application;

application program code that is configured to utilize the policy transfer agent to check whether the intrusion detection system enabled application is authorized to receive the requested intrusion detection system policy and communicating the requested intrusion detection system policy to the intrusion detection system enabled application if authorized;

application program code that is configured to initialize the intrusion detection system enabled application with the intrusion detection system policy if the intrusion detection system enabled application is properly authorized by the policy transfer agent; and application program code that is configured to detect for intrusions by the intrusion detection system enabled application if the intrusion detection system application is properly authorized by the policy transfer agent by:

application program code that is configured to identify by the application program, where in the application code the intrusion detection system policy is to be checked against information that has either been received as an incoming communication, or which is to be sent as an outgoing communication;

application program code that is configured to obtain information by the application program;

application program code that is configured to selectively evaluate the information obtained by the application program against information in the intrusion detection system policy by the corresponding intrusion detection system program code;

application program code that is configured to make a conditional response based upon information in the intrusion detection system policy if an intrusion associated with the application program is detected, where the conditional response determines whether at least one response action should be taken by the intrusion detection system agent code, by the application program or by both the intrusion detection system agent code and the application program;

program code that is configured to communicate a request from the intrusion detection system module to the intrusion detection system agent to take action, wherein the request identifies at least one of the intrusion detection system module itself or characteristics of the intrusion and program code that is configured to take action by the intrusion detection system agent code based upon the request received from the intrusion detection system program code associated with the application program if the conditional response determines that the intrusion detection system agent should take action; and program code that is configured to take action by the application program associated with the detected intrusion based upon information received from the intrusion detection system program code if the conditional response determines that the application program should take action.

15. The computer program product according to claim 14, further comprising program code that is configured to allocate the application program code to the same logical memory space as the intrusion detection system program code.

16. The computer program product according to claim 14, wherein the application program code that is configured to selectively evaluate the information obtained by the application program against information in the intrusion detection system policy by the corresponding intrusion detection system program code is further configured to compare the information obtained by the application program to the intrusion detection service policy.

17. The computer program product according to claim 16, further comprising program code that is configured to allocate the application program code, the intrusion detection system program code, and the intrusion detection system policy to the same logical memory space.

18. The computer program product according to claim 16, further comprising program code that is configured to download the intrusion detection system policy from a network-accessible repository to the intrusion detection system program code.

19. The computer program product according to claim 14, wherein the application program code that is configured to obtain information receives a communication to the application program and the action program code is configured to discard information in the communication to the application program code.

20. The computer program product according to claim 14, wherein the application program code that is configured to obtain information receives a communication to the application program and the action program code is configured to discontinue communication with a source of the communication to the application program code.

21. The computer program product according to claim 14, further comprising program code configured to utilize the transfer agent to check the authorization of the application program before providing the intrusion detection policy in the same memory space as the application program.

22. The computer program product according to claim 14, wherein the application program code that is configured to obtain information is configured to perform at least one of sensing events or receiving communications.

23. A computer system that detects intrusions, the computer system comprising:

an intrusion detection system policy transfer agent, an intrusion detection agent and an intrusion detection system enabled application having an application program and an intrusion detection system module, all executing on a host computer, wherein:

the application program is configured to communicate an initialization request to the corresponding intrusion detection system module to begin intrusion detection;

the intrusion detection system module is configured to initiate a request to the policy transfer agent to provide an intrusion detection system policy specifically configured for the intrusion detection system enabled application;

the policy transfer agent checks whether the intrusion detection system enabled application is authorized to receive the requested intrusion detection system policy and communicates the requested intrusion detection system policy to the intrusion detection system enabled application if authorized;

the intrusion detection system enabled application is initialized with the intrusion detection system policy if the intrusion detection system enabled application is properly authorized by the policy transfer agent;

the intrusion detection system enabled application detects for intrusions if the intrusion detection system application is properly authorized by the policy transfer agent by identifying by the application program, where in the application code the intrusion detection system policy is to be checked against information that has either been received as an incoming communication, or which is to be sent as an outgoing communication;

the intrusion detection system module is configured to evaluate information obtained by a corresponding application program for an intrusion by comparing the information obtained by the application program to the intrusion detection system policy where the intrusion detection system module is uniquely associated with the application; and the intrusion detection system module makes a conditional response based upon information in the intrusion detection system policy if an intrusion associated with the application program is detected, where the conditional response determines whether at least one response action should be taken by an the intrusion detection system agent, by the application program or by both the intrusion detection system agent and the application program;

the intrusion detection system module communicates a request to the intrusion detection system agent to take action, wherein the request identifies at least one of the intrusion detection system module itself or characteristics of the intrusion and the intrusion detection system agent takes an action based upon the request received from the intrusion detection system module associated with the application program if the conditional response determines that the intrusion detection system agent should take action; and the application program associated with the detected intrusion implements an action based upon information received from the intrusion detection system module if the conditional response determines that the application program should take action.

24. The computer system of claim 23, wherein the intrusion detection system transfer agent is configured to download the intrusion detection system policy from a network-accessible repository to the intrusion detection system module.

25. The computer system of claim 23, wherein the intrusion detection system agent is configured to take a response action based on the intrusion detection system module detecting an intrusion in a communication to the application program.

26. The computer system of claim 23, wherein the transfer agent checks the authorization of the application program before providing the intrusion detection policy in the same memory space as the application program.

27. The computer system according to claim 23, wherein information obtained by a corresponding application program comprises at least one of sensed events or received communications.

* * * * *